US010518604B2

(12) United States Patent
Sakashita et al.

(10) Patent No.: US 10,518,604 B2
(45) Date of Patent: Dec. 31, 2019

(54) VEHICLE-AIR-CONDITIONER ACCUMULATOR ATTACHMENT-PART STRUCTURE

(71) Applicant: HONDA MOTOR CO., LTD., Minato-ku, Tokyo (JP)

(72) Inventors: Shoji Sakashita, Saitama (JP); Toshikatsu Mouri, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/841,462

(22) Filed: Dec. 14, 2017

(65) Prior Publication Data
US 2018/0178624 A1 Jun. 28, 2018

(30) Foreign Application Priority Data

Dec. 27, 2016 (JP) .................................. 2016-252910

(51) Int. Cl.
*B60H 1/00* (2006.01)
*F25B 43/00* (2006.01)

(52) U.S. Cl.
CPC ....... *B60H 1/00535* (2013.01); *F25B 43/006* (2013.01)

(58) Field of Classification Search
CPC ............. F25B 43/006; B60H 1/00535; B60H 1/00521; B60H 1/3229
USPC ................................................. 62/503, 239
See application file for complete search history.

(56) References Cited

U.S. PATENT DOCUMENTS

| 4,888,962 | A | * | 12/1989 | Harper | .................... | F16B 2/065 |
| | | | | | | 62/503 |
| 6,041,618 | A | * | 3/2000 | Patel | .................... | B60H 1/3229 |
| | | | | | | 180/68.4 |
| 6,192,695 | B1 | * | 2/2001 | Hirota | .................... | F25B 41/04 |
| | | | | | | 62/159 |
| 6,378,327 | B1 | * | 4/2002 | Corrigan | .............. | B60H 1/3229 |
| | | | | | | 62/239 |
| 2007/0277549 | A1 | * | 12/2007 | Tsuboi | ............... | B60H 1/00571 |
| | | | | | | 62/513 |
| 2015/0292780 | A1 | * | 10/2015 | Kitamura | ................ | F25B 13/00 |
| | | | | | | 62/324.1 |

FOREIGN PATENT DOCUMENTS

| JP | 56-058064 | 5/1981 |
| JP | 10-300283 | 11/1998 |
| JP | 2008-110752 | 5/2008 |

OTHER PUBLICATIONS

Japanese Office Action for Japanese Patent Application No. 2016-252910 dated Aug. 27, 2019.

* cited by examiner

*Primary Examiner* — Joseph F Trpisovsky
(74) *Attorney, Agent, or Firm* — Amin, Turocy & Watson, LLP

(57) ABSTRACT

Provided is a structure for a vehicle air conditioner. The structure comprises a compressor and an accumulator. The accumulator comprises an elastic member that has a thermal insulation property. The elastic member is provided on an external surface of the accumulator. The accumulator is held to a vehicle body by an attachment bracket. A plate holds the bottom surface of the accumulator. Further, the accumulator is held in a pressed state by the attachment bracket via the elastic member.

11 Claims, 5 Drawing Sheets

VEHICLE-AIR-CONDITIONER ACCUMULATOR ATTACHMENT-PART STRUCTURE

CROSS-REFERENCE TO RELATED APPLICATION

Priority is claimed on Japanese Patent Application No. 2016-252910, filed on Dec. 27, 2016, the contents of which are incorporated herein by reference.

BACKGROUND

Field of the Invention

The present invention relates to a vehicle-air-conditioner accumulator attachment-part structure.

Background

As an example of vehicle air conditioners, a vehicle air conditioner is known in which an accumulator that separates a return refrigerant into gas and liquid and holds the refrigerant is connected to a suction part of a compressor of a heat-exchange cycle. In most cases, the accumulator is held by an attachment bracket and is attached to a vehicle body in a power installation room such as an engine room (for example, refer to Japanese Patent Application, Publication No. 2008-110752).

SUMMARY

In the accumulator of the vehicle air conditioner, when the air conditioner performs a heat pump operation at a chilly or cold time, the temperature of a return refrigerant that flows inside may become a lower temperature than external air, and accordingly, the external surface of the accumulator may become an extremely low temperature. In this case, there is a possibility that frost is generated on the external surface of the accumulator, and the frost flows out at the time of a subsequent defrosting operation and adheres to a peripheral component as ice. Therefore, it is desired to prevent frost formation to the accumulator at a chilly or cold time.

Further, the accumulator of the vehicle air conditioner easily absorbs external heat in the power installation room and the like at a cooling operation. Therefore, the temperature of the refrigerant that is suctioned to the compressor by the heat which is absorbed from the accumulator is increased, and this easily causes a cooling efficiency to be decreased.

Further, the accumulator that is attached to the vehicle body via the attachment bracket is connected to the compressor, a unit of a switching valve, and the like by a pipe made of a metal. Therefore, a structure that absorbs production errors of components is required at the attachment part of the accumulator.

Further, a switching valve that switches a flow path is connected to a pipe on the upstream side of the accumulator. Therefore, when the switching valve is operated, an operation sound of the switching valve is easily transmitted to the vehicle body side via the accumulator and the attachment bracket. When the operation sound is transmitted to the vehicle body, the operation sound may be dissonant to an occupant in a vehicle room. Therefore, it is desired to prevent transmission of the operation sound.

An object of an aspect of the present invention is to provide a vehicle-air-conditioner accumulator attachment-part structure that is capable of preventing frost formation of the accumulator at a chilly or cold time, that is capable of preventing a decrease in a cooling efficiency at a cooling operation, that is further capable of absorbing dimension dispersion between an accumulator and a component around the accumulator, and that is also capable of preventing transmission of an operation sound of a switching valve to a vehicle body.

A vehicle-air-conditioner accumulator attachment-part structure according to an aspect of the present invention includes: an accumulator of a vehicle air conditioner, which is provided in a heat-exchange cycle having: a compressor that discharges a suctioned refrigerant; an internal heat exchanger that performs, while changing the refrigerant that is discharged from the compressor into a gas phase or a liquid phase, a heat exchange between the refrigerant and air for air conditioning; and an external heat exchanger that performs, while changing the refrigerant that is discharged from the compressor into a gas phase or a liquid phase, a heat exchange between the refrigerant and an atmosphere outside a vehicle room, which separates the refrigerant that has passed through at least one of the internal heat exchanger and the external heat exchanger into gas and liquid and holds the refrigerant, and which allows a gas constituent of the refrigerant to flow into a suction part of the compressor; and an attachment bracket that attaches the accumulator to a vehicle body, wherein an elastic member having a thermal insulation property is provided on an external surface of the accumulator, and the accumulator is held by the attachment bracket via the elastic member.

According to the above configuration, heat transfer between the accumulator and a space around the accumulator is cut off by the elastic member having a thermal insulation property. Therefore, when a heat pump operation is performed at a chilly or cold time, frost formation on the external surface of the accumulator does not easily occur. Further, at a cooling operation, heat is not easily absorbed into the accumulator from the vicinity of the accumulator. Therefore, it is possible to prevent a decrease in a cooling efficiency.

Further, since the elastic member is interposed between the attachment bracket and the accumulator, it is possible to absorb dimension dispersion between the accumulator and a component around the accumulator by the elastic member, and it is also possible to prevent transmission of an operation sound of a switching valve to a vehicle body.

The elastic member may be provided on the accumulator in a state of covering a main external surface of the accumulator.

In this case, the thermal insulation property of the accumulator by the elastic member is further enhanced.

According to an aspect of the present invention, an elastic member having a thermal insulation property is provided on an external surface of an accumulator, and the accumulator is held by an attachment bracket via the elastic member. Therefore, it is possible to prevent frost formation of the accumulator at a chilly or cold time, it is possible to prevent a decrease in a cooling efficiency at a cooling operation, it is further possible to absorb dimension dispersion between the accumulator and a component around the accumulator, and it is also possible to prevent transmission of an operation sound of a switching valve to a vehicle body.

DESCRIPTION OF THE EMBODIMENTS

Hereinafter, an embodiment of the present invention will be described with reference to the drawings.

Figure 1:
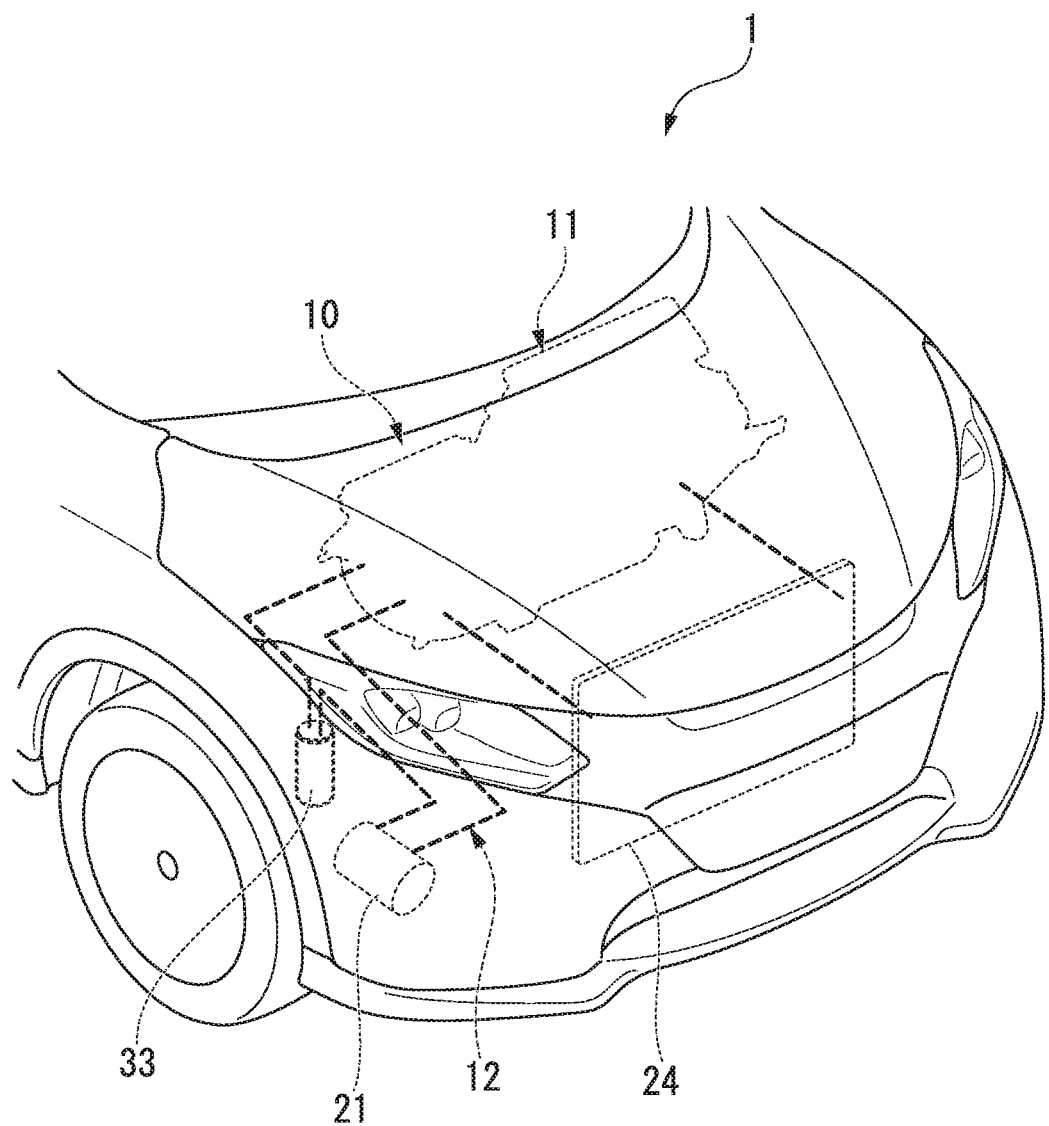
FIG. 1 is a perspective view of a vehicle according to an embodiment of the present invention.
Figure 2:
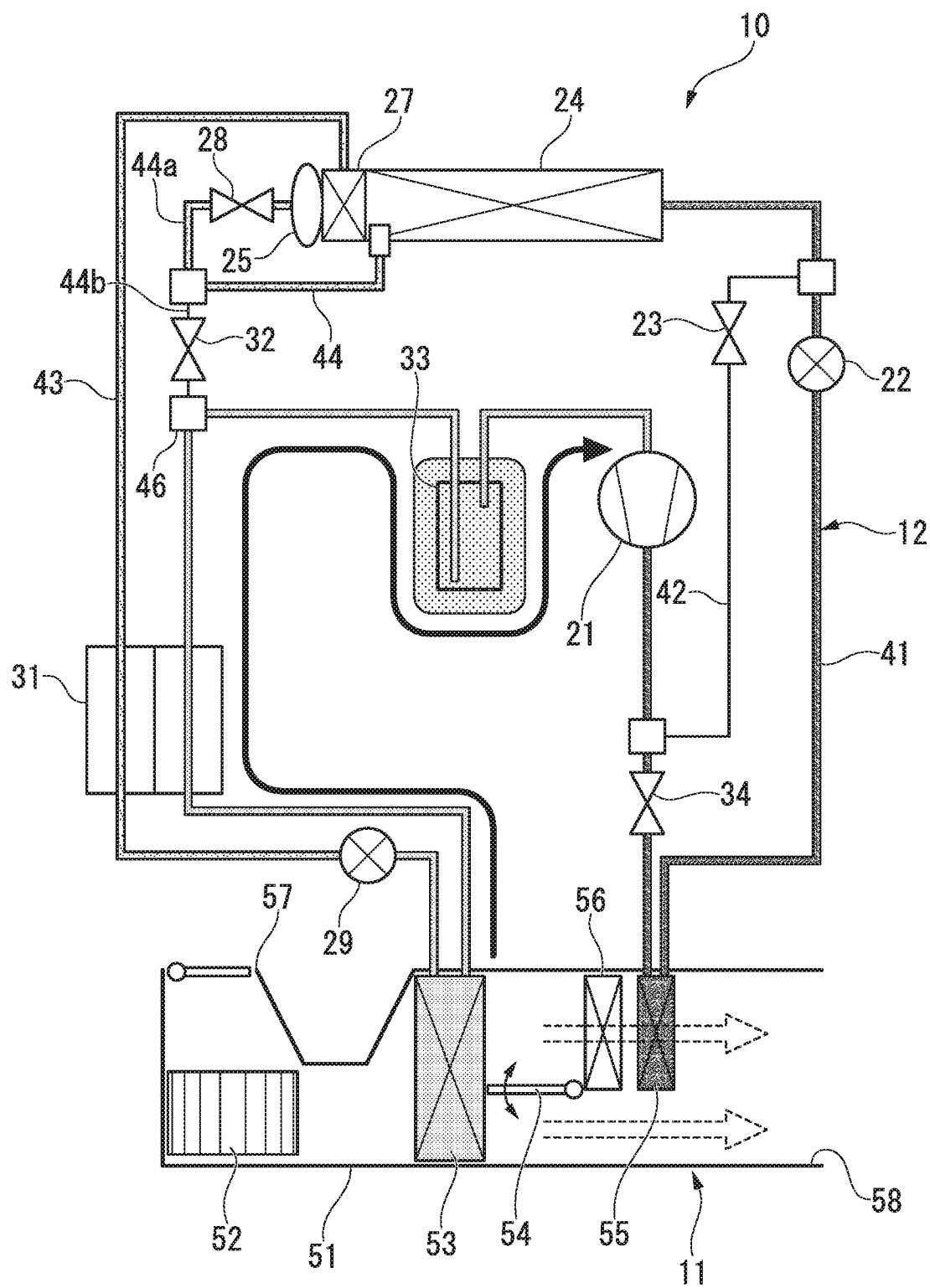
FIG. 2 is a configuration view of a vehicle air conditioner according to the embodiment of the present invention.

FIG. 1 is a view of a vehicle 1 that employs a vehicle air conditioner 10 according to the present embodiment seen from a right front upper direction. FIG. 2 is a configuration view of the vehicle air conditioner 10. In FIG. 1, an arrow FR that indicates a vehicle frontward direction, an arrow UP that indicates a vehicle upward direction, and an arrow LH that indicates a vehicle left side direction are shown.

The vehicle air conditioner 10 according to the present embodiment is provided, for example, on an electric vehicle that does not include an engine (internal combustion engine) as a drive source of the vehicle 1 and the like. The vehicle air conditioner 10 includes: a heat-exchange cycle 12 that circulates a refrigerant while changing the refrigerant into a gas phase or a liquid phase and transfers a heat energy; an air conditioner unit 11 that adjusts the temperature and humidity of air for air conditioning and that blows out the air for air conditioning into a vehicle room; and a control device (not shown) that controls the heat-exchange cycle 12 and the air conditioner unit 11.

The air conditioner unit 11 has a duct 51 in which air for air conditioning flows. A blower 52, an evaporator 53, an air mix door 54, a PTC (Positive Temperature Coefficient) heater 56, and a condenser 55 are arranged inside the duct 51.

The duct 51 has an air intake port 57 that is arranged at an upstream position in the flow direction of the air for air conditioning and an air blow port 58 that is arranged at a downstream position. The blower 52, the evaporator 53, the air mix door 54, the PTC heater 56, and the condenser 55 described above are arranged in this order from the upstream side toward the downstream side in the flow direction of the air for air conditioning.

The blower 52 is driven, for example, in response to a drive voltage that is applied by a control by the control device and sends air for air conditioning (at least one of internal air and external air) that is introduced into the duct 51 via the air intake port 57 toward the downstream side.

The evaporator 53 is an internal heat exchanger that performs a heat exchange between a low-temperature and low-pressure refrigerant that flows into the inside of the evaporator 53 and air for air conditioning (air that flows in the duct 51) that passes around the evaporator 53. The evaporator 53 cools the air for air conditioning that passes around the evaporator 53 by heat absorption when the refrigerant evaporates.

The condenser 55 is an internal heat exchanger that is capable of releasing heat by a high-temperature and high-pressure refrigerant that passes through the inside of the condenser 55. The condenser 55 heats air for air conditioning that passes around the condenser 55.

The PTC heater 56 is arranged at a position on a more downstream side than the evaporator 53 in the duct 51 and on a more upstream side than the condenser 55. The PTC heater 56 has a built-in PTC element of which the resistance value is increased in accordance with a temperature increase. The PTC heater 56 heats air for air conditioning that passes around the PTC heater 56.

The air mix door 54 is rotatable by a drive means (not shown) that is driven by a control by the control device. Specifically, the air mix door 54 is rotated between a heating position at which an air passing route (heating route) toward a heating part (PTC heater 56 and the condenser 55) is opened and a cooling position at which an air passing route (cooling route) that bypasses the heating part (PTC heater 56 and the condenser 55) is opened on the inside of the duct 51. By being operated to be rotated between the heating position and the cooling position, the air mix door 54 adjusts a ratio of the air for air conditioning that passes through the heating part to the air for air conditioning that bypasses the heating part and thereby adjusts the temperature of the air for air conditioning that is blown out into the vehicle room from the air blow port 58.

The heat-exchange cycle 12 includes the evaporator 53 described above, the condenser 55 described above, a compressor 21, a cutoff valve 34, a first expansion valve 22, a bypass valve 23, an external heat exchanger 24, a cooling valve 28, a receiver tank 25, a sub cooling condenser 27, a cooling supplementary heat exchanger 31, a second expansion valve 29, a heating valve 32, and an accumulator 33. In the heat-exchange cycle 12, the constituent members are mutually connected via a refrigerant flow path.

A suction part of the compressor 21 is connected to the accumulator 33, and a discharge part of the compressor 21 is connected to the condenser 55 side. The compressor 21 receives a drive force of the drive means that is driven by a control by the control device to be driven, suctions mainly a gas constituent of the refrigerant from the accumulator 33, compresses the refrigerant, and then discharges the refrigerant toward the condenser 55 side as the high-temperature and high-pressure refrigerant.

The first expansion valve 22 is a diaphragm valve of which the opening degree is adjustable by a control by the control device. The first expansion valve 22 reduces the pressure of the refrigerant that is discharged from the condenser 55, expands the refrigerant, and then discharges the refrigerant to the external heat exchanger 24 as a low-temperature and low-pressure refrigerant in a two-phase gas-liquid (liquid-phase rich) spray state mainly when performing a heating operation.

A passage from the discharge part of the compressor 21 via the condenser 55 to the first expansion valve 22 is a heating air-conditioning main passage 41.

The cutoff valve 34 that is opened and closed by a control by the control device is interposed between the compressor 21 and the condenser 55 of the heating air-conditioning main passage 41. A part between the compressor 21 and the cutoff valve 34 of the heating air-conditioning main passage 41 is connected to a more downstream part than the first expansion valve 22 via a first bypass passage 42. The bypass valve 23 that is controlled to be opened and closed by the control device is provided on the first bypass passage 42.

When the bypass valve 23 is closed, and the cutoff valve 34 is opened by a control by the control device, the refrigerant that is discharged from the compressor 21 passes through the condenser 55 and the first expansion valve 22 in the heating air-conditioning main passage 41 and flows into the external heat exchanger 24. On the other hand, when the cutoff valve 34 is closed, and the bypass valve 23 is opened by the control device, the refrigerant that is discharged from the compressor 21 passes through the first bypass passage 42 and flows into the external heat exchanger 24 in a high-temperature and high-pressure state.

The external heat exchanger 24 performs a heat exchange between the refrigerant that flows into the inside of the external heat exchanger 24 and external atmosphere. The external heat exchanger 24 can absorb heat from the external atmosphere by a low-temperature and low-pressure refrigerant that passes through the inside and evaporates the refrigerant by heat absorption from the external atmosphere mainly when performing a heating operation. The external heat exchanger 24 can absorb heat from the external atmosphere by a low-temperature and low-pressure refrigerant that passes through the inside and evaporates the refrigerant by heat absorption from the external atmosphere mainly when performing a heating operation. The external heat exchanger 24 can release heat to the external atmosphere by a high-temperature and high-pressure refrigerant that passes through the inside and condenses the refrigerant by heat release to the external atmosphere mainly when performing a cooling operation.

A flow-out passage 44 to which the refrigerant that passes through the inside of the external heat exchanger 24 flows out is connected to the external heat exchanger 24. The flow-out passage 44 branches to a cooling passage 44a and a heating passage 44b. The cooling valve 28 is provided on the cooling passage 44a. The heating valve 32 is provided on the heating passage 44b.

The cooling valve 28 is formed of an opening and closing valve that opens and closes the cooling passage 44a. The cooling valve 28 is controlled by the control device. The cooling valve 28 is made to be an open state mainly when performing a cooling operation. The cooling valve 28 is made to be a closed state mainly when performing a heating operation.

The receiver tank 25 is connected to a more downstream part of the cooling passage 44a than the cooling valve 28.

The sub cooling condenser 27 is connected to the downstream side of the receiver tank 25. The sub cooling condenser 27 performs a heat exchange between the refrigerant that flows out from the receiver tank 25 and the external atmosphere. A downstream part of the sub cooling condenser 27 is connected to a heat-removing air-conditioning main passage 43. The refrigerant of which the heat is exchanged with the external atmosphere by the sub cooling condenser 27 flows out to the heat-removing air-conditioning main passage 43.

The second expansion valve 29 is arranged at a more upstream part of the heat-removing air-conditioning main passage 43 than the evaporator 53. The second expansion valve 29 reduces the pressure of the refrigerant that passes through the heat-removing air-conditioning main passage 43, expands the refrigerant, and then discharges the refrigerant to the evaporator 53 as a low-temperature and low-pressure refrigerant in a two-phase gas-liquid (gas-phase rich) spray state.

The cooling supplementary heat exchanger 31 is arranged so as to straddle an upstream part of the heat-removing air-conditioning main passage 43, which is at a more upstream position than the second expansion valve 29, and a downstream part of the heat-removing air-conditioning main passage 43, which is at a more downstream position than the evaporator 53. The cooling supplementary heat exchanger 31 performs a heat exchange between the upstream part and the downstream part described above and cools the refrigerant of the upstream part before the refrigerant flows into the evaporator 53 when performing a cooling operation.

The heat-removing air-conditioning main passage 43 in the present embodiment is a passage that is connected from the downstream part of the external heat exchanger 24 to the accumulator 33 via the cooling valve 28, the receiver tank 25, the sub cooling condenser 27, the cooling supplementary heat exchanger 31, the second expansion valve 29, and the evaporator 53.

The heating valve 32 is arranged on the heating passage 44b that bypasses the heat-removing air-conditioning main passage 43 and that connects the downstream part of the external heat exchanger 24 and the accumulator 33. The heating valve 32 is formed of an opening and closing valve that opens and closes the heating passage 44b. The heating valve 32 is controlled by the control device. The heating valve 32 is made to be an open state mainly when performing a heating operation. The heating valve 32 is made to be a closed state mainly when performing a cooling operation.

The heating valve 32, together with the cooling valve 28, constitutes a passage switching part that switches the passage which connects the external heat exchanger 24 and the suction part side of the compressor 21 to any of the heat-removing air-conditioning main passage 43 and the heating passage 44b.

The accumulator 33 is arranged between the suction part of the compressor 21 and a converging part 46 that connects a downstream end of the heat-removing air-conditioning main passage 43 and a downstream end of the heating passage 44b. The accumulator 33 separates the refrigerant that flows from the converging part 46 into gas and liquid, stores an excess liquid constituent (liquid-phase) of the refrigerant in the inside, and allows mainly a gas constituent (gas-phase) of the refrigerant to be suctioned to the compressor 21.

Next, a main air conditioning operation of the vehicle air conditioner 10 according to the present embodiment is described.

(a) Cooling Operation

In the heat-exchange cycle 12, the refrigerant that is discharged from the compressor 21 flows through the heating air-conditioning main passage 41 (the condenser 55 and the first expansion valve 22), the external heat exchanger 24, and the heat-removing air-conditioning main passage 43 (the second expansion valve 29 and the evaporator 53) in this order and returns to the compressor 21 via the accumulator 33.

At this time, the heat of the air for air conditioning that passes through the inside of the duct 51 of the air conditioner unit 11 is removed by the evaporator 53, and then, the air for air conditioning is blown into the vehicle room from the air blow port 58. The temperature of the air for air conditioning that is blown into the vehicle room from the air blow port 58 is controlled by an opening degree control of the air mix door 54.

When performing a strong cooling, the refrigerant that is discharged from the compressor 21 is caused to flow toward the first bypass passage 42 side, and the flow of the refrigerant to the condenser 55 is bypassed.

(b) Heating Operation

In the heat-exchange cycle 12, the refrigerant that is discharged from the compressor 21 flows through the heating air-conditioning main passage 41 (the condenser 55 and the first expansion valve 22), the external heat exchanger 24, and the heating passage 44b in this order and returns to the compressor 21 via the accumulator 33.

At this time, the air for air conditioning that passes through the inside of the duct 51 of the air conditioner unit 11 is heated by the condenser 55 and is then blown into the vehicle room from the air blow port 58. Also in this case, the temperature of the air for air conditioning that is blown into the vehicle room from the air blow port 58 is controlled by an opening degree control of the air mix door 54.

At a chilly or cold time and the like, the PTC heater 56 is appropriately operated, and the shortfall in the temperature increase is compensated.

(c) Defrosting Operation Mode

In the heat-exchange cycle 12, the refrigerant that is discharged from the compressor 21 flows through the first bypass passage 42, the external heat exchanger 24, and the heating passage 44b in this order and returns to the compressor 21 via the accumulator 33.

At this time, the high-temperature and high-pressure refrigerant that is discharged from the compressor 21 is introduced to the external heat exchanger 24 while maintaining a relatively high temperature. Thereby, the frost that attaches to the external heat exchanger 24 is removed by the heat of the refrigerant that is introduced to the external heat exchanger 24.

The evaporator 53 and the condenser 55 are integrally incorporated inside the air conditioner unit 11. The air conditioner unit 11 is arranged at a rearward position of a dashboard (not shown) in the vehicle room. On the other hand, the external heat exchanger 24, the compressor 21, the accumulator 33, the heating valve 32, the cooling valve 28, and the like are arranged in a power installation room in front of the vehicle room.

Figure 3:
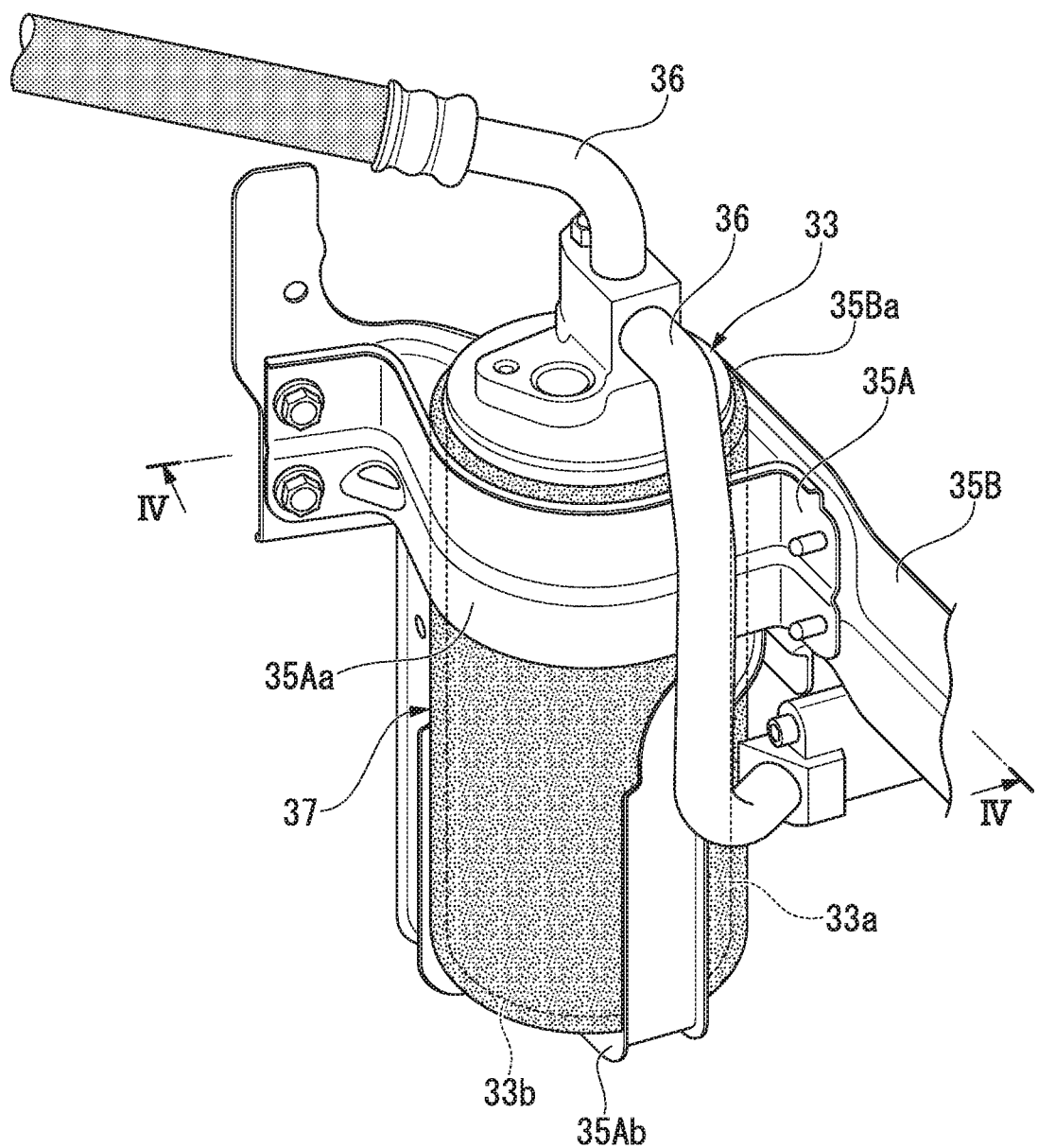
FIG. 3 is a perspective view of an attachment part of an accumulator according to the embodiment of the present invention.
Figure 4:
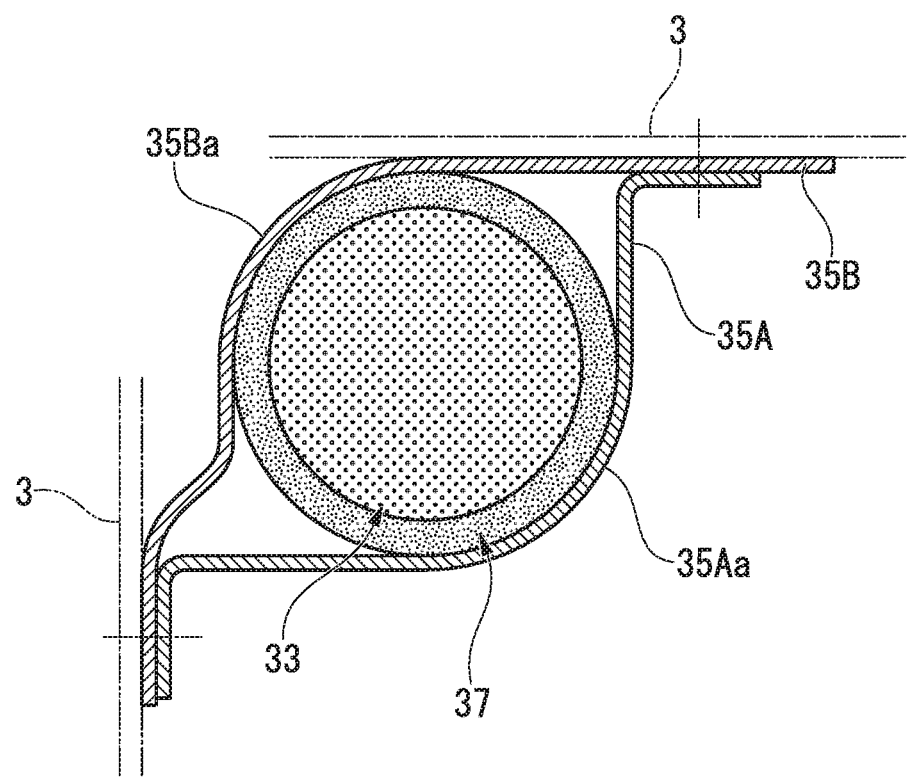
FIG. 4 is a cross-sectional view along a IV-IV line of FIG. 3 of the accumulator according to the embodiment of the present invention.

FIG. 3 is a view of an attachment part of the accumulator 33 in the power installation room seen from a diagonally upward direction. FIG. 4 is a view showing a cross-section along a IV-IV line of FIG. 3.

In the case of the present embodiment, the accumulator 33 is formed of a tank having a substantially cylindrical shape. The accumulator 33 is attached to a frame member 3 of a vehicle body via a pair of attachment brackets 35A, 35B in a state where the axis line of a cylindrical part is directed in a vertical direction. Two pipes 36 that constitute the refrigerant flow path of the heat-exchange cycle 12 are connected to an upper part of the accumulator 33.

Circumferential surface-holding parts 35Aa, 35Ba that hold an outer circumferential surface 33a of the accumulator 33 are formed on the pair of attachment brackets 35A, 35B. A holding plate 35Ab that holds a bottom surface 33b of the accumulator 33 is integrally connected to the circumferential surface holding part 35Aa of the accumulator 33 of the one attachment bracket 35A. The attachment brackets 35A, 35B are fixed to the frame member 3 of the vehicle body by bolt fastening or welding.

An elastic member 37 having a thermal insulation property such as an EPT sealer is joined to the outer circumferential surface 33a and the bottom surface 33b of the accumulator 33. The elastic member 37 is formed in a cylindrical shape having a bottom. The elastic member 37 continuously covers the outer circumferential surface 33a and the bottom surface 33b (main external surface of the accumulator) of the accumulator 33.

The outer circumferential surface 33a of the accumulator 33 is held in a pressed state by the circumferential surface-holding parts 35Aa, 35Ba of the attachment brackets 35A, 35B via the elastic member 37. The bottom surface 33b of the accumulator 33 is supported by the holding plate 35Ab via the elastic member 37.

As described above, in the attachment part structure of the accumulator 33 according to the present embodiment, the elastic member 37 having a thermal insulation property is joined to the outer surface of the accumulator 33, and the accumulator 33 is held by the attachment brackets 35A, 35B via the elastic member 37. Therefore, heat transfer between the accumulator 33 and atmosphere around the accumulator 33 is cut off by the elastic member 37 having a thermal insulation property.

Accordingly, when the vehicle air conditioner 10 performs a heat pump operation (heating by the condenser 55) at a chilly or cold time, most of the outer surface of the accumulator 33 that becomes an extremely low temperature is thermally cut off by the elastic member 37 from the peripheral atmosphere. Thereby, frost formation around the accumulator 33 and the heat insulation member does not easily occur. Therefore, when employing the attachment part structure, it is possible to prevent a large amount of frost that adheres around the accumulator 33 being melted at the subsequent defrosting operation, becoming ice, and adhering to a peripheral component from occurring.

Figure 5:
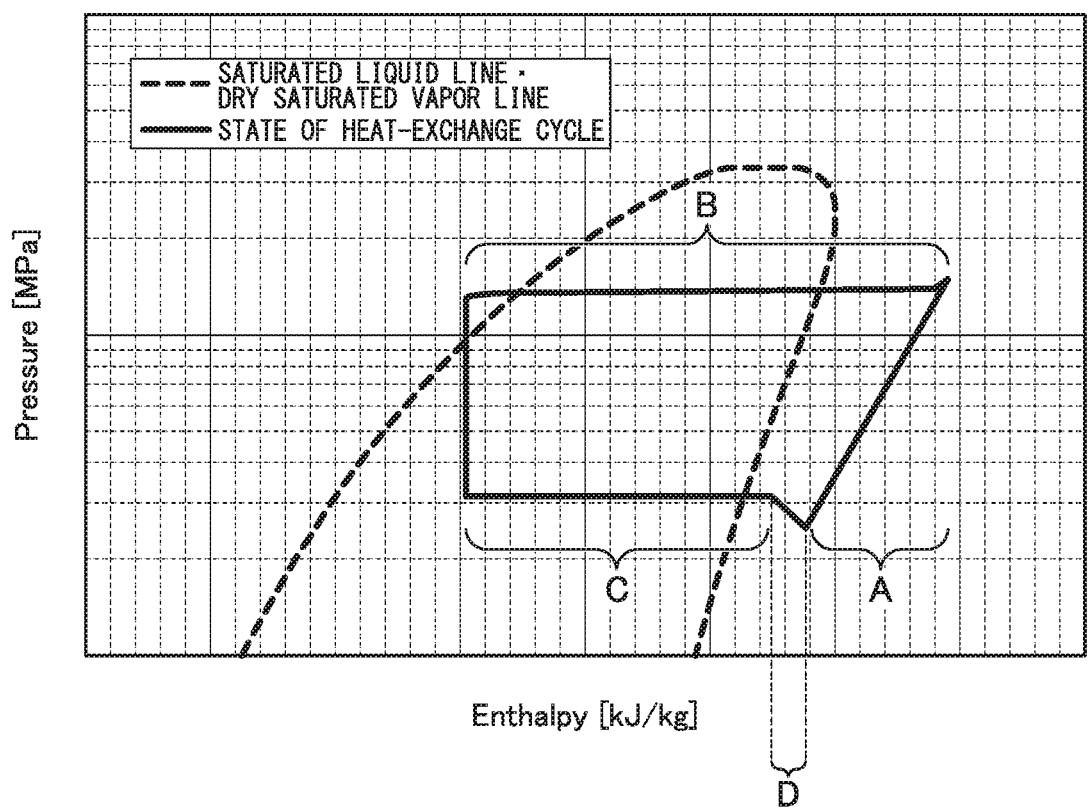
FIG. 5 is a pressure-specific enthalpy line view of a heat-exchange cycle according to the embodiment of the present invention.

FIG. 5 is a pressure-specific enthalpy line view of the heat-exchange cycle 12. In FIG. 5, "A" represents a region in which compression by the compressor 21 is performed, "B" represents a region in which heat release by the condenser 55 is performed, "C" represents a region in which heat absorption by the evaporator 53 is performed, and "D" represents a region in which heat reception by the accumulator 33 and the pipe part is performed.

When the vehicle air conditioner 10 performs a cooling operation, most of the outer surface of the accumulator 33 is thermally cut off by the elastic member 37 from the peripheral atmosphere, and therefore, even in the region "C" of FIG. 5, heat is not easily absorbed into the accumulator 33 from the vicinity of the accumulator 33. Therefore, when employing the attachment part structure, it is possible to enhance a cooling efficiency at a cooling operation.

In the attachment part structure of the accumulator 33 according to the present embodiment, the elastic member 37 is interposed between the attachment brackets 35A, 35B and the outer surface of the accumulator 33. Therefore, even when the accumulator 33 and a member that is connected to the accumulator 33 have some production errors, the errors are absorbed by the elastic member 37, and it is possible to easily assemble the accumulator 33 and the member that is connected to the accumulator 33 as an integral module.

In the attachment part structure of the accumulator 33 according to the present embodiment, the elastic member 37 is interposed between the attachment brackets 35A, 35B and the outer surface of the accumulator 33. Therefore, when an operation sound of a switching valve such as the heating valve 32 and the cooling valve 28 is transmitted to the accumulator 33, it is possible to prevent the operation sound of the switching valve from being transmitted to the vehicle body.

Further, in the attachment part structure of the accumulator 33 according to the present embodiment, the elastic member 37 is joined to the accumulator 33 in a state of covering not only a part that overlaps with the attachment brackets 35A, 35B but also a main external surface (the outer circumferential surface 33a and the bottom surface 33b) of the accumulator 33. Therefore, it is possible to sufficiently enhance the thermal insulation property of the accumulator 33 by the elastic member 37.

The invention is not limited to the embodiment described above, and a variety of design changes can be made without departing from the scope of the invention. For example, in the embodiment described above, an attachment bracket that attaches the accumulator 33 to the vehicle body via the elastic member 37 is formed of the pair of attachment brackets 35A, 35B; however, the attachment bracket may be formed of a single component or may be formed of three or more components. Further, in the embodiment described above, the elastic member 37 covers only the outer circumferential surface 33a and the bottom surface 33b of the accumulator 33; however, the entire accumulator 33 may be covered by the elastic member 37.

What is claimed is:

1. A vehicle-air-conditioner accumulator attachment-part structure, comprising:
    an accumulator of a vehicle air conditioner,
        which is provided in a heat-exchange cycle having: a compressor that discharges a suctioned refrigerant; an internal heat exchanger that performs, while changing the refrigerant that is discharged from the compressor into a gas phase or a liquid phase, a heat exchange between the refrigerant and air for air conditioning; and an external heat exchanger that performs, while changing the refrigerant that is discharged from the compressor into a gas phase or a liquid phase, a heat exchange between the refrigerant and an atmosphere outside a vehicle room,
        which separates the refrigerant that has passed through at least one of the internal heat exchanger and the external heat exchanger into gas and liquid and holds the refrigerant, and
        which allows a gas constituent of the refrigerant to flow into a suction part of the compressor;
    an attachment bracket that circumferentially surrounds a portion of an upper area of the accumulator, and wherein the attachment bracket attaches the upper area of the accumulator to a vehicle body, and
    a plate that holds a bottom surface of the accumulator, wherein the plate is formed between the attachment bracket and the bottom surface of the accumulator, and wherein the plate is connected to the attachment bracket;
    wherein an elastic member having a thermal insulation property is provided on an external surface of the accumulator, and
    the accumulator is held in a pressed state by the attachment bracket via the elastic member, the attachment bracket being a separate member from the elastic member.

2. The vehicle-air-conditioner accumulator attachment-part structure according to claim 1,
    wherein the elastic member is provided on the accumulator in a state of covering a main external surface of the accumulator.

3. The vehicle-air-conditioner accumulator attachment-part structure according to claim 1,
    wherein the attachment bracket is constituted of a bracket that holds an outer circumferential surface of the accumulator and the plate holds the bottom surface of the accumulator.

4. The vehicle-air-conditioner accumulator attachment-part structure according to claim 2,
    wherein the attachment bracket is constituted of a bracket that holds an outer circumferential surface of the accumulator and the plate holds the bottom surface of the accumulator.

5. The vehicle-air-conditioner accumulator attachment-part structure according to claim 1,
    wherein the attachment bracket is constituted of a pair of attachment brackets that hold an outer circumferential surface of the accumulator.

6. The vehicle-air-conditioner accumulator attachment-part structure according to claim 1,
    wherein the attachment bracket is constituted of a first surface-holding part formed on a first bracket and a second surface-holding part formed on a second bracket.

7. The vehicle-air-conditioner accumulator attachment-part structure according to claim 6,
    wherein the first surface-holding part and the second surface-holding part hold respective portions of an outer circumferential surface of the accumulator.

8. The vehicle-air-conditioner accumulator attachment-part structure according to claim 6,
    wherein the plate is integrally connected to the first surface-holding part.

9. The vehicle-air-conditioner accumulator attachment-part structure according to claim 1,
    wherein the elastic member is formed in a cylindrical shape having a bottom.

10. The vehicle-air-conditioner accumulator attachment-part structure according to claim 1,
    wherein the elastic member is joined to an outer circumferential surface and the bottom surface of the accumulator.

11. The vehicle-air-conditioner accumulator attachment-part structure according to claim 1,
    wherein the elastic member continuously covers an outer circumferential surface and the bottom surface of the accumulator.

* * * * *